Sept. 15, 1953  G. C. MILLER  2,652,266
VEHICLE MUD FLAP
Filed June 24, 1950  3 Sheets-Sheet 1

INVENTOR
GLENN C. MILLER
BY
Cook and Schermerhorn
ATTORNEYS

Sept. 15, 1953 G. C. MILLER 2,652,266
VEHICLE MUD FLAP
Filed June 24, 1950 3 Sheets-Sheet 2

INVENTOR
GLENN C. MILLER
BY
Cook and Schermerhorn
ATTORNEYS

Sept. 15, 1953
G. C. MILLER
2,652,266
VEHICLE MUD FLAP
Filed June 24, 1950
3 Sheets-Sheet 3
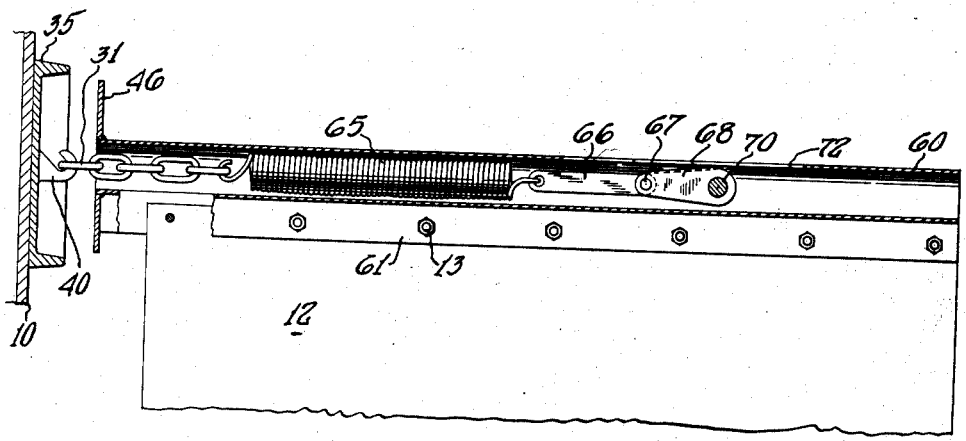
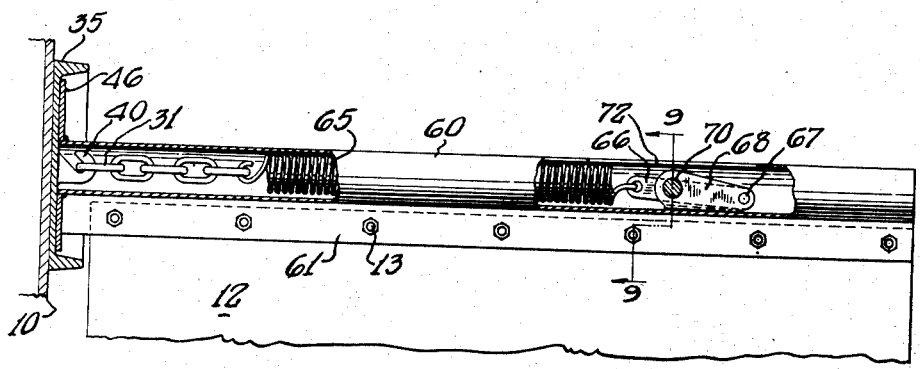
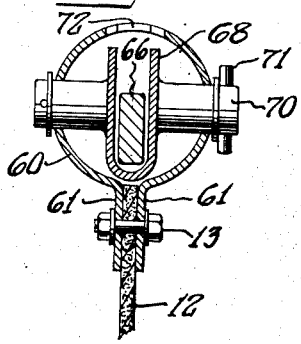
INVENTOR
GLENN C. MILLER
BY
Cook and Schermerhorn
ATTORNEYS Patented Sept. 15, 1953

2,652,266

UNITED STATES PATENT OFFICE 2,652,266

VEHICLE MUD FLAP

Glenn C. Miller, Portland, Oreg.

Application June 24, 1950, Serial No. 170,143

13 Claims. (Cl. 280—154.5)

This invention relates to a mud flap to prevent material from being thrown up behind the rear wheels of a vehicle.

On certain types of vehicles such as log trailers, it is impractical to mount conventional fenders and mud guards over the wheels. The wheels of such vehicles are entirely exposed, with the result that the tires throw up water, mud and even stones from the road, to constitute a serious hazard to another vehicle following closely behind. Conventional fenders and mud flaps cannot be used on log trailers because they quickly become damaged in the business of loading and unloading logs and in other phases of log hauling operations over unimproved forest roads which involve problems peculiar to the industry and different from the ordinary problems of highway trucking. Log trailers, however, also usually operate for considerable distances at fairly high speeds upon improved public highways where the requirements of general highway safety demand some kind of a shield to intercept material thrown up behind the rear wheels. No practical form of shield or mud flap for this purpose has heretofore been developed which would withstand the extremely rough usage to which all log handling equipment is subjected, and so log trucks and trailers have long enjoyed immunity from penalty for operating on the public highways without the safeguards required of all other vehicles. The hazard from uncovered rear wheels has been constantly increasing over the years as the tires have become larger and truck and trailer speeds have increased.

The general object of the present invention is, therefore, to provide a suitable shield or mud flap behind the rear wheels of a vehicle on which conventional mud guard equipment cannot be used. Another object is to provide a mud flap for log trucks and trailers which will withstand the rough usage encountered in log hauling. Another object is to provide a flexible support and mounting for a mud flap of the type described that will yield and not be damaged by falling and rolling logs, and which will not interfere with the hauling of the empty trailer unit on the truck or tractor unit in the usual manner. Another object is to provide a mud flap having a supporting arm equipped with a spring tension device which will permit the arm to rock on its base in all directions, and which will restore the arm to normal position after the obstruction has been removed. Still another object is to provide a mud flap of the type described which is easily and quickly installed and removed.

These and other objects are attained in a number of embodiments disclosed in the accompanying drawings. In each embodiment the shield or flap consists of a flexible panel of durable material adapted to hang in a vertical position from a supporting arm which projects horizontally from the frame of the vehicle behind the rear wheels. The supporting arm is equipped with a flat base end to seat against a flat base member on the vehicle. The supporting arm carries a spring tensioned link which may be secured to a hook or eye extending through an opening in the center of said base end to seat the base end firmly and thereby hold the supporting arm horizontal under the weight of the flap. Thus, a falling log or other obstruction encountered by the flap will merely push the arm aside, causing the said base end to rock on its seat without bending the arm or damaging any of the parts. Such rocking movement increases the spring tension which is effective to restore the arm to its original horizontal position as soon as it is free. Provision is also made for removing the spring tension from the connecting link to provide slack in the link for removing the device from the vehicle as a unit.

It is to be understood that the present flap is not limited to use on log trailers, and that various changes may be made in the construction and arrangement of parts without departing from the spirit of the invention.

In the drawings:

Figure 7 is a rear elevation view with parts in section, showing another embodiment of the device with the spring relaxed for installation or removal;

Figure 8 is a view similar to Figure 7 showing the spring tensioned to hold the device in operative position on the vehicle; and Figure 9 is a view taken on the line 9—9 of Figure 8.

Figure 1:
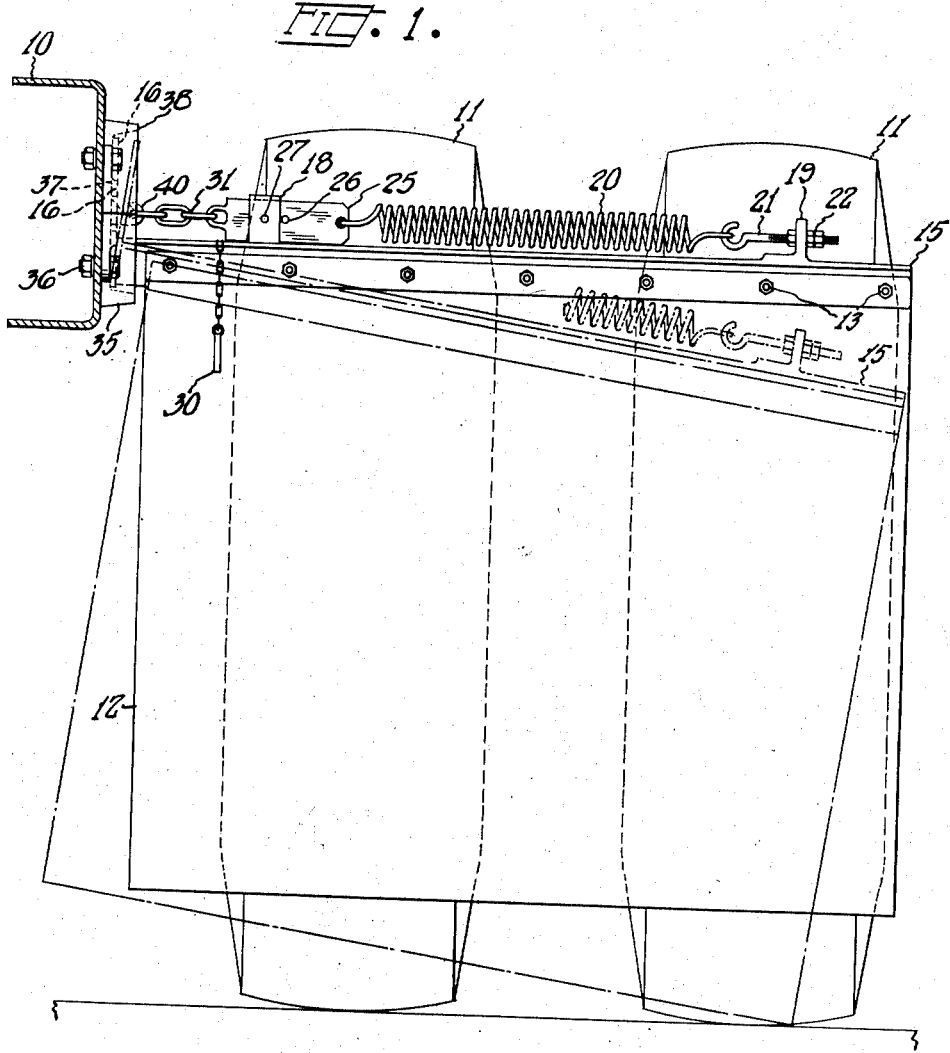
Figure 1 is a rear elevation view showing one embodiment of the device mounted in operative position behind the wheels of a vehicle.

Figure 1 is a rear elevation view showing one embodiment of the mud flap installed behind the rear wheels on the right side of a log trailer or the like. The numeral 10 designates a frame member of the trailer, and 11, 11 a pair of large dual wheels. In conventional log trailer construction, the logs are supported on transverse bunks mounted on the trailer frame, and there is no body and no fender over the wheels. Thus the water, mud, and even stones on the roadway are ordinarily thrown up by the rear wheels and against the windshield of any vehicle following closely behind.

Figure 2:
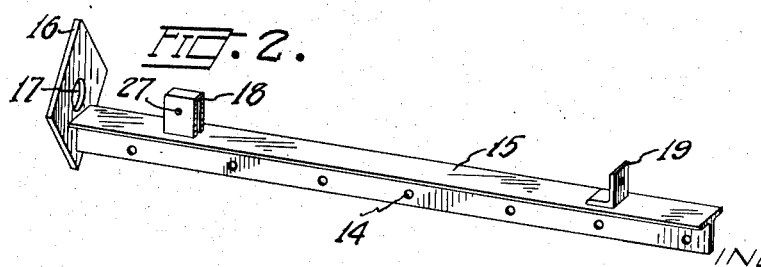
Figure 2 is a perspective view of the supporting arm shown in Figure 1.

The flap of the present invention comprises a rectangular sheet 12 of suitable flexible material, heavy enough to hand vertically and stop stones thrown up by the tires. This sheet preferably has a horizontal length slightly in excess of the over-all tire width, and a vertical height nearly equal to the diameter of the wheel to intercept most of the spray thrown up from a wet road surface. The top edge of the sheet 12 is attached and supported by a series of bolts 13 in holes 14 in a horizontal supporting arm 15. The arm 15 is equipped with a flat base end consisting of a plate 16 having a central hole 17 just above the arm as shown in Figure 2. The arm 15 also carries a guide member 18 and a spring anchor lug 19 for a tension spring 20. One end of spring 20 is anchored by a bolt 21 having nuts 22 to adjust the spring tension. The other end of the spring is connected with a slide bar 25 having a hole 26 to register with a hole 27 in the guide member 18 when the spring is stretched somewhat beyond its normal length. When the holes 26 and 27 are brought into registry, a pin 30 may be inserted to lock the slide 25 and hold the spring in stretched condition. The other end of slide 25 is connected with a link designated generally by the numeral 31 and which in the present embodiment consists of several links of chain. The parts thus far described form a part of the flap and are removable from the vehicle.

Figure 4:
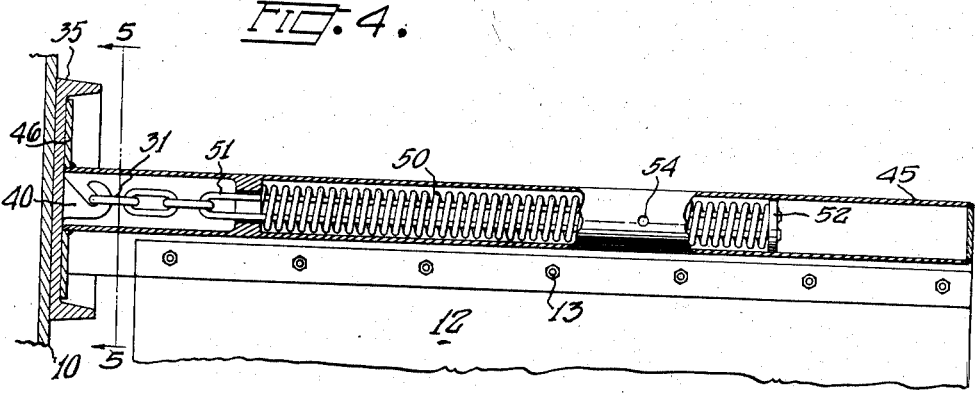
Figure 4 is a view similar to Figure 3 showing the spring released and the device mounted in operative position on the vehicle.
Figure 5:
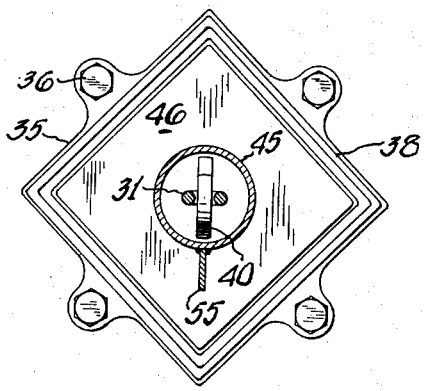
Figure 5 is a view taken on the line 5—5 of Figure 4.
Figure 6:
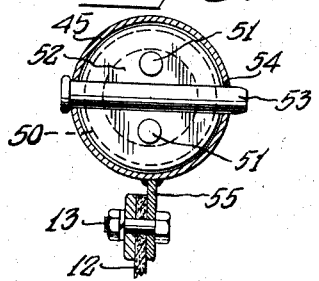
Figure 6 is a view taken on the line 6—6 of Figure 3.

In order to mount the flap on the vehicle, the frame member 10 is equipped with a base member 35 attached by means of bolts 36. Base member 35 is square in shape, as shown in Figure 5, and has a flat surface 37 surrounded by a sloping rim or flange 38. In the center of the flat surface 37 there is a hook 40 to project through the hole 17 in the plate 16 when the latter is seated against the flat surface 37. Reference is also made to Figure 4, which clearly shows these features in connection with a different form of supporting arm. When pin 30 is inserted in the holes 26 and 27 and plate 16 is seated against the flat surface 37 of the base member 35 within the surrounding rim 38 and with the hook 40 projecting through the hole 17, the link 31 may be engaged over the hook 40. Then, when pin 30 is withdrawn, the spring 20 will tension the link 31 to hold the plate 16 firmly against the flat surface 37 with arm 15 extended horizontally from the frame 10, as shown in full lines in Figure 1. Spring 20 should be sufficiently strong and nuts 22 should be adjusted to hold the arm 15 firmly under the weight of the flap so that it will not wobble or vibrate with the jarring of the vehicle.

If a log should fall on or against the arm 15, the arm will merely rock about one side or corner of the plate 16 as shown in broken lines without damage to the parts. When the obstruction has been removed, the tension in chain link 31 operates to pull the base plate 16 back against the flat surface 37 to return the arm 15 to its original position perpendicular to the vertical side of frame member 10. In this recovery movement the base plate 16 is guided by the internal sloping walls of the rim 38 and by hook 40 which extends through hole 17. The arm 15 is thereby capable of universal movement to yield resiliently in any direction and yet always return automatically to its original position.

When it is desired to remove the flap of Figure 1 from the vehicle, it is merely necessary to press down on the outer end of arm 15 to rock one side of plate 16 away from base member 35 as shown in broken lines, which will stretch the spring until hole 26 is brought into registry with hole 27, so that pin 30 can be inserted. After pin 30 is inserted, the spring 20 is inoperative to tension link 31 and return the arm 15 to horizontal position, whereupon the arm may be raised manually to slacken the link 31 so that it may be disengaged from hook 40. The spring 20 is held in extended position by the pin 30 until the flap is again installed on the vehicle.

Figures 3 to 6 illustrate a second embodiment wherein parts which are identical with the embodiment shown in Figure 1 are identified by the same reference characters. It will be observed that the flap 12 and mounting base 35 are the same as shown in Figure 1, but that the arm and spring arrangement are different. The arm in this case comprises a tube 45 having a flat base plate 46 integrally connected therewith at one end and having an internal abutment 47 for a compression spring 50. The link 31 is connected with a long link 51 extending through the entire length of the spring and anchored in a spring seat washer 52 which is adapted to slide in the tube 45. In installing and removing the flap, the spring is held in compressed condition by means of a pin 53 inserted in holes 54. Welded along the bottom side of tube 45 is a plate 55 to receive the bolts 13 for the flap.

Figure 3:
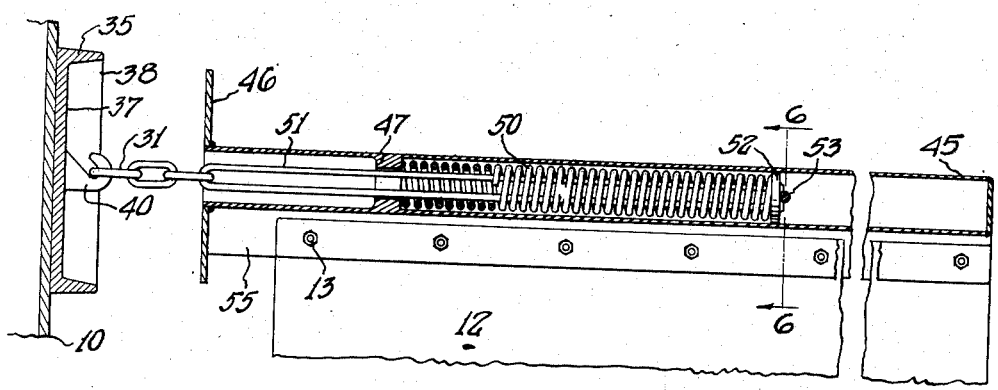
Figure 3 is a rear elevation view with parts in section, showing a second embodiment of the device with the spring compressed for installation or removal.

When the pin 53 is inserted, the spring 50 is held in compressed condition to provide sufficient slack in the links 51 and 31 so that the latter may easily be engaged over the hook 40 as shown in Figure 3. When pin 53 is removed, the expanding spring action draws link 31 and hook 40 into the end of tube 45, causing the flat base plate 46 to be seated firmly against the flat surface 37 of the base member 35, as shown in Figure 4. If the arm 45 is deflected in any direction, it will yield with resilience and will thereafter return to its original position, the hook 40 and link 31 constituting guide members for the end of tube 45. To remove the flap from the vehicle, it is merely necessary to pull the arm 45 straight out as shown in Figure 3 or swing it through an angle to compress the spring 50 sufficiently for insertion of the pin 53.

Another embodiment is illustrated in Figures 7 to 9, wherein previously described parts are again identified by the same reference numerals. In this case the supporting arm for the flap comprises a tubular member 60 having flange portions 61 to receive the bolts 13 for flap 12. The tube carries an internal tension spring 65 connected at one end with a link or series of links designated generally by the numeral 31 as in the previous embodiment. The other end of the spring is connected with a link 66 which in turn is pivotally connected at 67 with a crank arm 68 on a transverse crank shaft 70. Shaft 70 is equipped on one of its outer ends with a pin 71 or other device to be engaged by a socket in a crank handle. Tube 65 is slotted on one side at 72 to allow the crank arm 68 to rotate through a half turn.

In Figure 7 the crank arm 68 is turned toward the spring 65 to relieve the tension therein and produce sufficient slack in the link 31 for installation and removal of the flap from the vehicle. If the shaft 70 and crank arm 68 are now rotated clockwise through an angle slightly in excess of 180°, the link 66 will be drawn to the right a distance equal to twice the length of crank arm 68, causing the link 31 and hook 40 to be drawn into the end of the tube as shown in Figure 8. In this rotational movement of the shaft 70, the crank arm 68 passes to an over-center or self-locking position where it is retained in engagement with inside wall of the tube by operation of the spring tension.

The principal difference between the embodiment shown in Figures 7 to 9 and the previous embodiment resides in the fact that a tool is required to turn the crank shaft 70 to relieve the chain tension in order to remove the flap in Figure 8 from the vehicle, whereas in the first two embodiments the flap could be removed by anyone without a tool. This feature might be desired in some types of vehicles to discourage unauthorized removal of the flaps. Once the flap is installed, however, as shown in Figure 8, its resilient yielding action when it encounters or is struck by some obstruction is the same as in the other embodiments to prevent damage to the supporting arm for the flap.

It will be obvious in the various embodiments described hereinabove that the base member 35 may be mounted or adapted for mounting on any convenient part of the vehicle behind the rear wheels. A log truck has no body or other parts to support accessory devices, and so in this type of vehicle it is most convenient to attach the base member 35 directly to one of the main frame members.

It will further be apparent that the device may be simplified to some extent for applications where it is not necessary to remove the flaps. Thus, in Figure 1 the guide member 18 and pin 30 could be eliminated and additional chain links substituted for the plate link 25. Unauthorized removal could be discouraged further by closing the hook 40 to form an eye so that link 31 could not be disengaged therefrom. The embodiment shown in Figure 4 could very easily be converted into a permanent installation by merely substituting an eye for the hook 40 and eliminating the hole 54 and pin 53. The embodiment shown in Figure 8 could be converted into a permanent installation by substituting an eye for the hook 40 and by substituting a simple pin for the shaft 70, crank arm 68 and link 66 to anchor the end of the spring in a fixed position.

Having now described my invention and in what manner the same may be used, what I claim as new and desire to protect by Letters Patent is:

1. A vehicle mud flap and the like, comprising a supporting arm for the flap, a base end on said arm having a central opening, a link carried by said arm to extend through said opening, tensioning means for tensioning said link, a base member having a seat for said base end, connector means on said base member for said link, and a member on said arm operatively connected with said tensioning means to relieve the tension on said link for removal of said link from said connector means.

2. A vehicle mud flap and the like, comprising a supporting arm for the flap, a base member having a seat for said arm, a connector element disposed in a central position in said base member, a link on said arm engageable with said connector member, resilient tensioning means on said arm for said link, and a member on said arm operatively connected with said tensioning means to relieve the tension on said link for enabling manual engagement and disengagement of said link and said connector means.

3. A vehicle mud flap and the like, comprising an elongated supporting arm for the flap, a coil spring extending along said arm, a base end on said arm, a base member for said base end to hold said arm in a fixed position, a connector link passing through said base end and having one end attached to said base member and the other end attached to said spring to accommodate rocking movement of said arm, and an adjustable abutment engaging said spring to provide slack in said connector link for installation and removal of said arm from said base member.

4. In a vehicle mud flap and the like, a supporting arm for the flap, a spring carried by said arm, a base end on said arm, a base member adapted to seat said base end to hold said arm in a fixed position, a flexible connector engaged at one end with said base member and engaged at its other end with said spring, and adjustable abutment means engaging said spring to provide slack in said connector for installation and removal of said arm from said base member.

5. A vehicle mud flap and the like comprising a supporting member for the flap, a base member having a seat for said supporting member, a link for connecting said supporting member with said base member, tensioning means for said link to hold said supporting member firmly seated against said base member, and adjustable means engaging said tensioning means for relieving the tension in said link to enable installation and removal of said supporting member.

6. A vehicle mud flap and the like, comprising a supporting arm extending along the top edge of said flap, a flat base end on said arm, a central opening in said base end, a base member having a flat surface to seat said base end and having a connector member to project through said opening, a tension device carried by said arm, a link tensioned thereby and engaged with said connector member to secure said arm resiliently to said base member for rocking movement, and adjustable abutment means engaging said tension device to provide slack in said link for installation and removal of said arm from said base member.

7. A vehicle mud flap and the like, comprising a supporting arm for the flap, a spring carried by said arm, a base end on said arm, a base member having a seat for said base end, a flexible connector engaged at one end with said base member and at its other end with said spring, a guide on said arm, said flexible connector comprising a link and a slide, said slide passing through said guide, and means to fix the position of said slide with respect to said guide for relieving the tension of said spring on said connector.

8. A vehicle mud flap and the like, comprising a supporting arm for the flap, a spring carried by said arm, a base end on said arm, a base member having a seat for said base end, a flexible connector engaged at one end with said base member and engaged at its other end with said spring, a guide on said arm, said flexible connector comprising a link and a slide, said slide passing through said guide, aligned openings in said 9. A vehicle mud flap and the like, comprising a supporting arm for the flap, a base end on said arm, a base member having a seat for said base end, said arm having a fixed abutment, a spring mounted on said arm and engaging said abutment, a flexible connector connecting said base member and the end of said spring opposite said abutment, and means for restricting the expansion of said spring for relieving the tension on said flexible connector to enable installation and removal of said flap.

10. A vehicle mud flap and the like, comprising a supporting arm for the flap, a base end on said arm, a base member having a seat for said base end, said arm having a fixed abutment, a spring mounted on said arm and engaging said abutment, a flexible connector connecting said base member and the end of said spring opposite said abutment, the arm having aligned openings, and a pin insertable in the openings to restrict the expansion of the spring.

11. A vehicle mud flap and the like, comprising a supporting arm for the flap, a spring carried by said arm, a base end on said arm, a base member having a seat for said base end, a flexible connector engaged at one end with said base member and engaged at its other end with one end of said spring, the other end of said spring connected to a link-and-crank-arm device mounted on said arm for tensioning said spring.

12. A support for a vehicle mud flap and the like comprising a flap supporting arm having a base end, a base member having a seat for said base end for holding said arm in a predetermined position, a detachable linkage removably connecting said arm and said base member, a tension device connected with said linkage for securing said flap supporting arm and base member resiliently in seated engagement, and a member on said arm operatively connected with said tension device to relieve the tension on said linkage for disconnecting said linkage from said base member.

13. A vehicle mud flap and the like comprising a supporting arm for the flap, a base end on said arm, a base member having a seat for said base end, a linkage connecting said arm and base member and having detachable hook connection with said base member, a spring tensioning said linkage to hold said base end resiliently against said seat, and means operatively connected with said arm and one end of said spring to relieve the spring tension on said linkage for engaging and disengaging said hook connection.

GLENN C. MILLER.

References Cited in the file of this patent

UNITED STATES PATENTS

| Number | Name | Date |
|---|---|---|
| 1,435,363 | Wood | Nov. 14, 1922 |
| 2,038,234 | Olen | Apr. 21, 1936 |
| 2,098,388 | Hruska | Nov. 9, 1937 |
| 2,397,151 | Mitchell | Mar. 26, 1946 |
| 2,414,676 | Taurmann et al. | Jan. 21, 1947 |